United States Patent [19]

Hanson

[11] Patent Number: 5,521,370
[45] Date of Patent: May 28, 1996

[54] PISTOL GRIP HAND-HELD DATA TERMINAL COOPERABLE WITH COMMUNICATING AND RECHARGING DOCK

[75] Inventor: George E. Hanson, Cedar Rapids, Iowa

[73] Assignee: Norand Corporation, Cedar Rapids, Iowa

[21] Appl. No.: 390,892

[22] Filed: Feb. 14, 1995

Related U.S. Application Data

[63] Continuation of Ser. No. 50,704, Apr. 21, 1993, abandoned, which is a continuation-in-part of Ser. No. 909,139, Jul. 6, 1992, abandoned, which is a continuation of Ser. No. 345,200, Apr. 28, 1989, abandoned, which is a continuation-in-part of Ser. No. 305,302, Jan. 31, 1989, abandoned.

[51] Int. Cl.⁶ ..................................................... G06K 7/10
[52] U.S. Cl. .............................................................. 235/472
[58] Field of Search ....................................... 235/462, 472

[56] References Cited

U.S. PATENT DOCUMENTS

| | | | |
|---|---|---|---|
| 3,143,697 | 8/1964 | Springer | 320/2 |
| 3,348,116 | 10/1967 | Freeman | 320/2 |
| 3,390,319 | 6/1968 | Robison | 320/2 |
| 4,141,616 | 2/1979 | Gottlieb | 320/2 |
| 4,345,147 | 8/1982 | Aaron et al. | 364/708 X |
| 4,387,297 | 6/1983 | Swartz et al. | 235/472 |
| 4,397,513 | 8/1983 | Clark et al. | 439/357 |
| 4,481,458 | 11/1984 | Lane | 320/2 |
| 4,558,270 | 12/1985 | Liautaud | 320/2 |
| 4,588,938 | 5/1986 | Liautaud et al. | 320/2 |
| 4,621,189 | 11/1986 | Kumar et al. | 235/472 |
| 4,628,193 | 12/1986 | Blum | 235/472 |
| 4,629,962 | 12/1986 | Arakawa | 320/2 |
| 4,701,003 | 10/1987 | Gruet | 439/680 |
| 4,721,849 | 1/1988 | Davis et al. | 235/472 |
| 4,758,717 | 7/1988 | Shepard et al. | 235/472 |
| 4,773,032 | 9/1988 | Uehara et al. | 364/709.04 |
| 4,801,924 | 1/1989 | Burgmann | 340/531 |
| 4,806,906 | 2/1989 | Oda et al. | 364/709.01 |
| 4,894,523 | 1/1990 | Chadima, Jr. et al. | 235/462 |
| 4,916,441 | 4/1990 | Gombrich | 364/709.11 |
| 4,953,113 | 8/1990 | Chadima, Jr. et al. | 364/708 |
| 4,970,379 | 11/1990 | Danstrom | 235/462 X |
| 5,023,824 | 6/1991 | Chadima, Jr. et al. | 364/708 |
| 5,052,943 | 10/1991 | Davis | 439/357 |

FOREIGN PATENT DOCUMENTS 385502  9/1990  European Pat. Off. .............. 235/462

OTHER PUBLICATIONS

Norand Corporation Service Instruction Book NX1400 Quad Communication Rack, 1st Edition; Nov. 1987, FIG. 4–1, (pp. 4–3/4–4) and FIG. 4–2 (pp. 4–6 and 4–7/4–8).

*Primary Examiner*—John Shepperd
*Attorney, Agent, or Firm*—Suiter & Associates

[57] ABSTRACT

A data capture system which includes both a hand-held data terminal having a pistol grip and a terminal receptacle for releasably receiving the hand held data terminal for battery recharging.

3 Claims, 5 Drawing Sheets

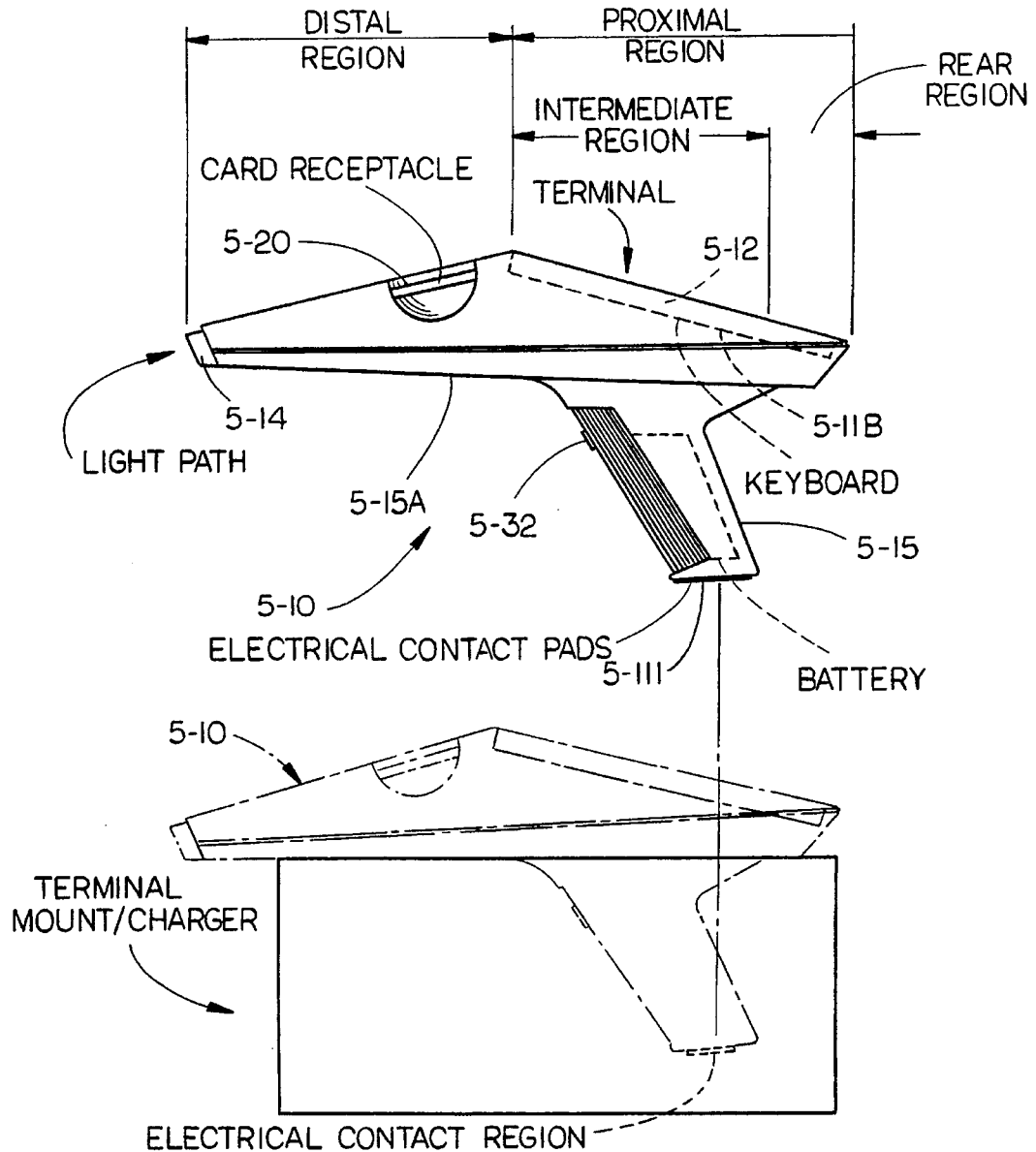
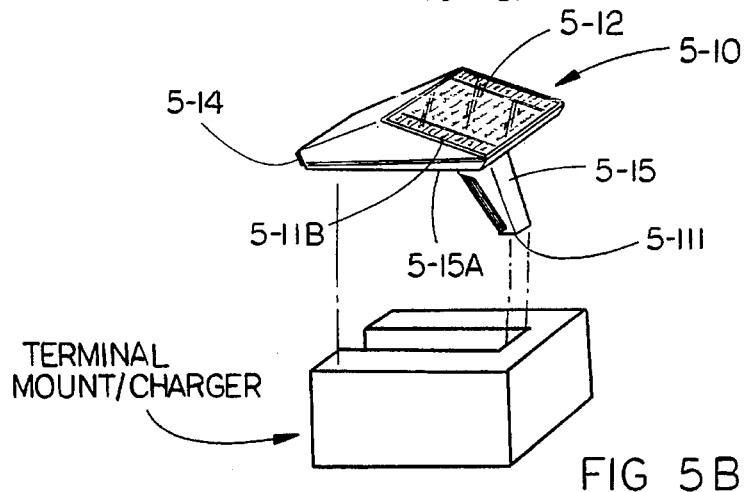

5,521,370

PISTOL GRIP HAND-HELD DATA TERMINAL COOPERABLE WITH COMMUNICATING AND RECHARGING DOCK

CROSS REFERENCE TO RELATED APPLICATIONS

The present application is a continuation of application Ser. No. 08/050,704, filed Apr. 21, 1993 now abandoned, which is a continuation-in-part of application Ser. No. 07/909,139 filed Jul. 6, 1992 (now abandoned) which in turn is a continuation of application Ser. No. 07/345,200 filed Apr. 28, 1989 (now abandoned) which is a continuation-in-part of said application Ser. No. 07/305,302 (now abandoned). Reference is made pursuant to 35 USC 120 to said copending application, and the entire disclosure thereof including the drawings is incorporated herein by reference.

BACKGROUND OF THE INVENTION

In the data capture field, there are many applications where hand-held data terminals should be of rugged construction so as to survive rough handling. Many operators are not inclined toward painstaking or precise manipulations. An example is in the use of RF data capture terminals on forklift trucks in factories and warehouses where items to be transported are identified by bar codes. Other examples are found in the field of route delivery and direct store delivery where many items are handled and the terminal means automates the accounting function. Even in applications where bar code data is transmitted on-line to a central station, it may be desirable for hand-held terminals to be inserted into docking apparatus for the interchange of data signals e.g. the loading of scheduling information or the like into the terminal at the beginning of a working shift. Further where terminal means has memory capacity for accumulating data during a delivery operation or the like, it may be desirable for such data to be transferred to a printer so that a hard copy may be produced. In cases where rechargeable batteries are used, the docking apparatus may provide for the recharging of such batteries at the same time as data communication is taking place.

It is conceived that it would be highly advantageous to provide a data capture system with docking apparatus adaptable to a wide range of terminal means, and which furthermore could be quickly and simply loaded in a relatively foolproof manner, and without requiring attention and care from operators engaged in physically demanding and arduous work routines. A docking apparatus would be desirable that completely avoids the use of mating pin and socket type electrical connections, and that does not rely on a specialized configuration of the terminal, e.g. the provision of an optical scanner tip which may be used for data communication.

SUMMARY OF THE INVENTION

The present invention relates particularly to data capture systems utilizing portable data terminal means which are to be held in one hand during data capture operation; however the invention is also applicable to portable data terminal means which may be mounted e.g. on a belt or e.g. on a vehicle during data capture operation. The data terminal means preferably will be of size and weight to be held in one hand, even though not so held during data capture operation. Also the data terminal means may be provided with batteries so as to be capable of portable operation, and such batteries may be rechargeable.

In a typical case, the portable data terminal means will have user interface means such as a manually operated data input (e.g. a keyboard) and/or a data output (e.g. a liquid crystal display), and will contain data storage means for the storage of programming instructions and/or program data, and/or for the storage of data capture information.

In accordance with an important aspect of the present invention, a docking apparatus removably receives portable data terminal means for purposes of data communication e.g. with a host computer and/or for the recharging of rechargeable batteries, and is so configured that the terminal means may have electrical contact pad means generally flush with the exterior of the terminal means. Preferably an abutting type engagement between the terminal contact pad means and cooperating electrical contact means of the docking apparatus is used for each electrical connection which is required at the docking apparatus, and the typical pin and socket type docking connections are entirely avoided.

In accordance with another aspect of the invention the same basic docking structure may be provided with greater or lesser numbers of contact positions. For example, one type of hand-held terminal intended for on-line RF communication with a host computer may have six contact pads for coupling with a local area network, and may have a nine position electrical connector for compatibility with an earlier type of interface system requiring interfitting of pin and socket connectors; another type of hand-held terminal designed for route accounting applications may have e.g. twelve external contact pads and be intended for interfacing only with systems having provision for open abutment type interconnection.

In an early embodiment as well as in a variety of later embodiments, the terminal receptacle means has been arranged so that with the terminal secured therein, the (or each) line of the terminal display remains visually observable in a convenient orientation relative to a driver of a vehicle for example. Also all of the key positions of the terminal keyboard are manually accessible, the legends on the keyboard having an orientation so as to be conveniently readable, e.g. by the driver of the vehicle. In particular the axis of each line of the display and of each row of key positions should be generally horizontal (rather than vertical) and the alphanumeric characters of the terminal display and keyboard legends should be upright (rather than inverted) as viewed by the operator.

Also in the early embodiment the terminal could be inserted into the receptacle with one hand against the action of a resilient bias stronger than the bias on the receptacle mating contacts. The same resilient bias allowing one handed loading, then served to firmly position the terminal for steady reliable electrical contact at each abutting type contact position in spite of vehicle jarring and vibration or the like.

The receptacle in the early embodiment was provided with a pair of standard nine pin D-sub connectors with threaded fastening of mating pin connectors, and with a power connector, so that a terminal while inserted into the receptacle could receive data from vehicle sensors via one nine pin connector, transmit commands via the other nine pin connector, and receive operating and/or charging power from the vehicle electric power system via the power connector.

Other objects, features and advantages will be apparent from the following detailed description, taken in connection with the accompanying drawings, and from the individual features and relationships of the respective appended claims.

BRIEF DESCRIPTION OF THE DRAWING FIGURES

FIG. 1 is a diagrammatic illustration of a vehicle data system showing a docking system in accordance with the present invention, and which may represent a data system associated with a gasoline-powered or battery-powered material handling vehicle such as a forklift truck.

FIG. 2 is a somewhat diagrammatic partial vertical sectional view illustrating constructional details of a docking apparatus for the system of FIG. 1, a portable battery powered terminal corresponding to that of FIG. 1 being shown as being inserted part way into the docking channel, to the point of initial electrical contact; and also indicating in diagrammatic fashion a laser bar code scanner device in a separate vehicle mounting or holster means and coupled with the terminal via an extendable coiled cable.

FIG. 5A is a diagrammatic view showing a data terminal and scanner means forming a single unit with a generally gun-shaped or pistol-shaped housing, and showing a terminal mount/charger, the data terminal and scanner means being shown in solid outline in a first position above the terminal mount/charger, and being shown in dot-dash outline in a second position as received by the terminal mount/charger.

Figure 1:
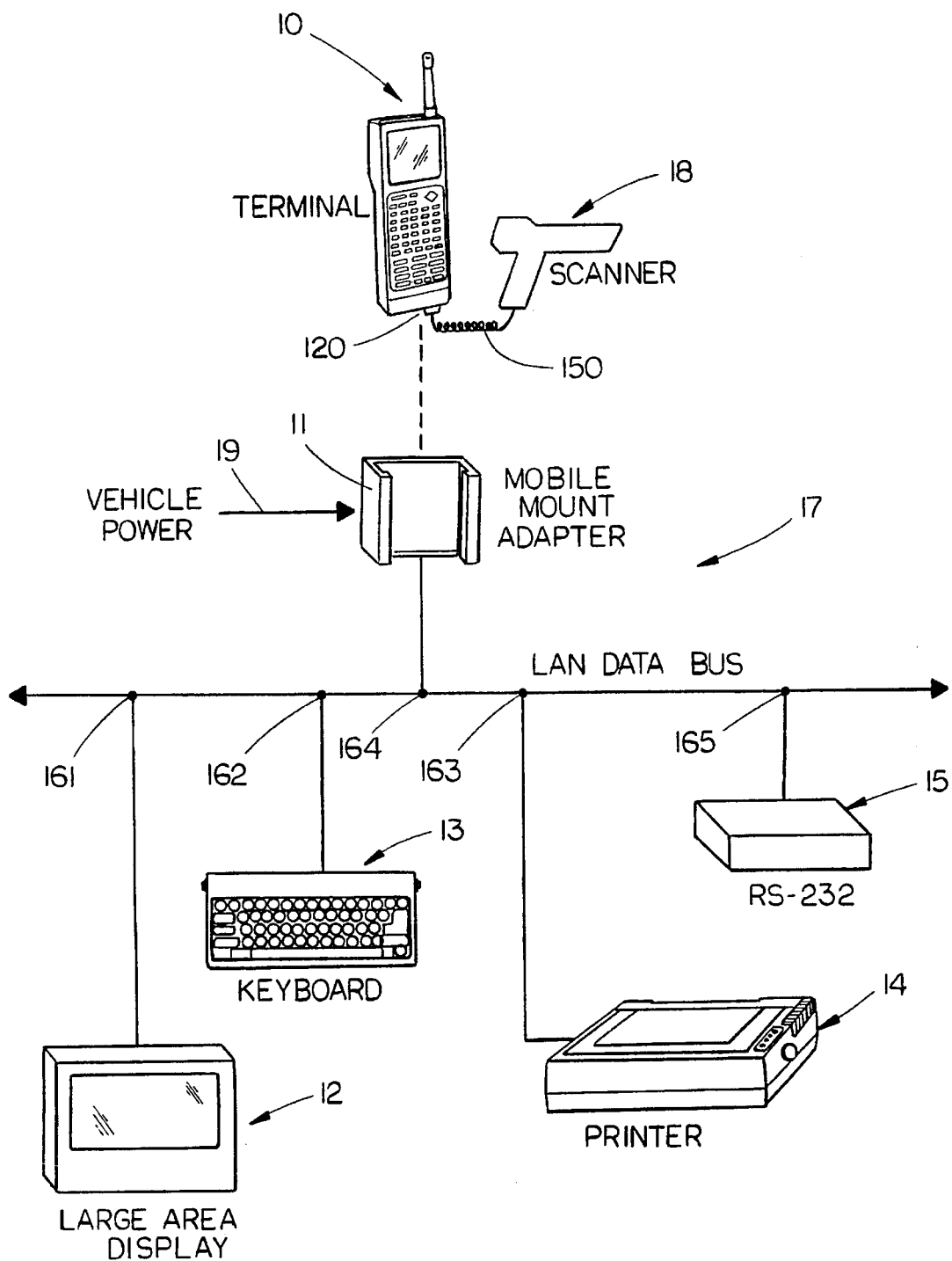

FIG. 5B is a purely diagrammatic pictorial indication of the channel configuration of the adapter of FIG. 1, and also shows a somewhat diagrammatic perspective view of the data terminal and scanner means of FIG. 5A, which view corresponds to the first figure of an application of Phillip Miller, et al., U.S. Ser. No. 07/136,097 filed Dec. 31, 1987, now abandoned.

DETAILED DESCRIPTION

FIG. 1 shows a portable battery operated data terminal 10 which may be connected by means of a docking unit 11 with one or more peripheral devices such is 12-15 (e.g. devices that might be particularly suited for forklift truck applications), the terminal and peripheral devices being coupled via a local area network data bus 16 of a self-propelled manually steered vehicle 17. For the case of a forklift truck 17, docking units such as 11 may releasably accommodate terminals such as terminal 10 which receive and store data obtained by means of an optical bar code or RF tag scanner 18. As indicated at 19, vehicle power is generally available from the electrical system of the vehicle. Certain electric vehicles such as lift trucks may operate from voltages as high as 72 volts, so higher voltage operation must be accommodated as well as the more typical value of twelve volts.

A preferred LAN configuration for the present invention may have the characteristics as described in detail in the incorporated pending application of George E. Hanson et al U.S. Ser. No. 07/305,302 filed Jan. 31, 1989 "VEHICLE DATA SYSTEM", (now abandoned).

A general characteristic of each LAN connected device is that communication and control intelligence is required to receive and transmit information through the LAN. The terminal (e.g. terminal 10, FIG. 1) with its processor and memory system may serve as a communication controller or primary processor while each peripheral device (such as 12–15, FIG. 1) may comprise a secondary unit which typically contains a microcomputer to perform communication and control tasks. Certain applications may involve multiple terminals connected to a single LAN data bus such as vehicle bus 16, FIG. 1, or such as LAN data bus 27 of fixed installation 28, FIG. 2. Multiple adapters enable communication from terminal to terminal, and from any of multiple terminals to an RS-232 interface means (such as 15, FIG. 1). Such an interface may be used for data interchange with a host computer system overseeing a multiplicity of vehicles (such as 17, FIG. 1) or fixed installations, and may include a LAN controller.

Vehicle mounted terminals such as terminal 10, FIG. 1, may be removed from vehicle docking units such as 11 at the end of a working shift and physically inserted into one of the docking units of a fixed installation for transfer of accumulated data to a host computer. The system may include LAN controller and protocol converters for adapting to an external RS-232 transmission system. Alternatively, a vehicle such as 17 could itself be coupled with a host computer via interface means 15, e.g. while for the case of an electrically driven vehicle, the vehicle batteries were being recharged. In each case, the batteries of terminals, would be recharged e.g. from AC power. Where interface means 15, FIG. 1, does not include the LAN controller, terminals such as 10 may be automatically switched when in docking unit 11 so as to activate primary LAN programming enabling the microcomputer of terminal 10 to act as the LAN controller when on board vehicle 17. When such a terminal 10 is inserted in one of docking units on the other hand, the terminal would operate as a standard secondary unit, and be identified dynamically by means of the primary programming of the LAN controller.

In FIG. 1, LAN data bus 16 may have an RF modem coupled therewith. The terminals may receive scheduling information or the like whenever required during a working day, from a host computer system via an RF link, for example. Thus on-line communication with a host computer may be established at any time. The network controller when separate from the terminal may contain a special buffer memory for storing data for one or more terminals which may be temporarily disconnected from the network. Such network controller and buffer memory may be part of an RF unit having two-way on-line communication with a host computer.

Figure 2:
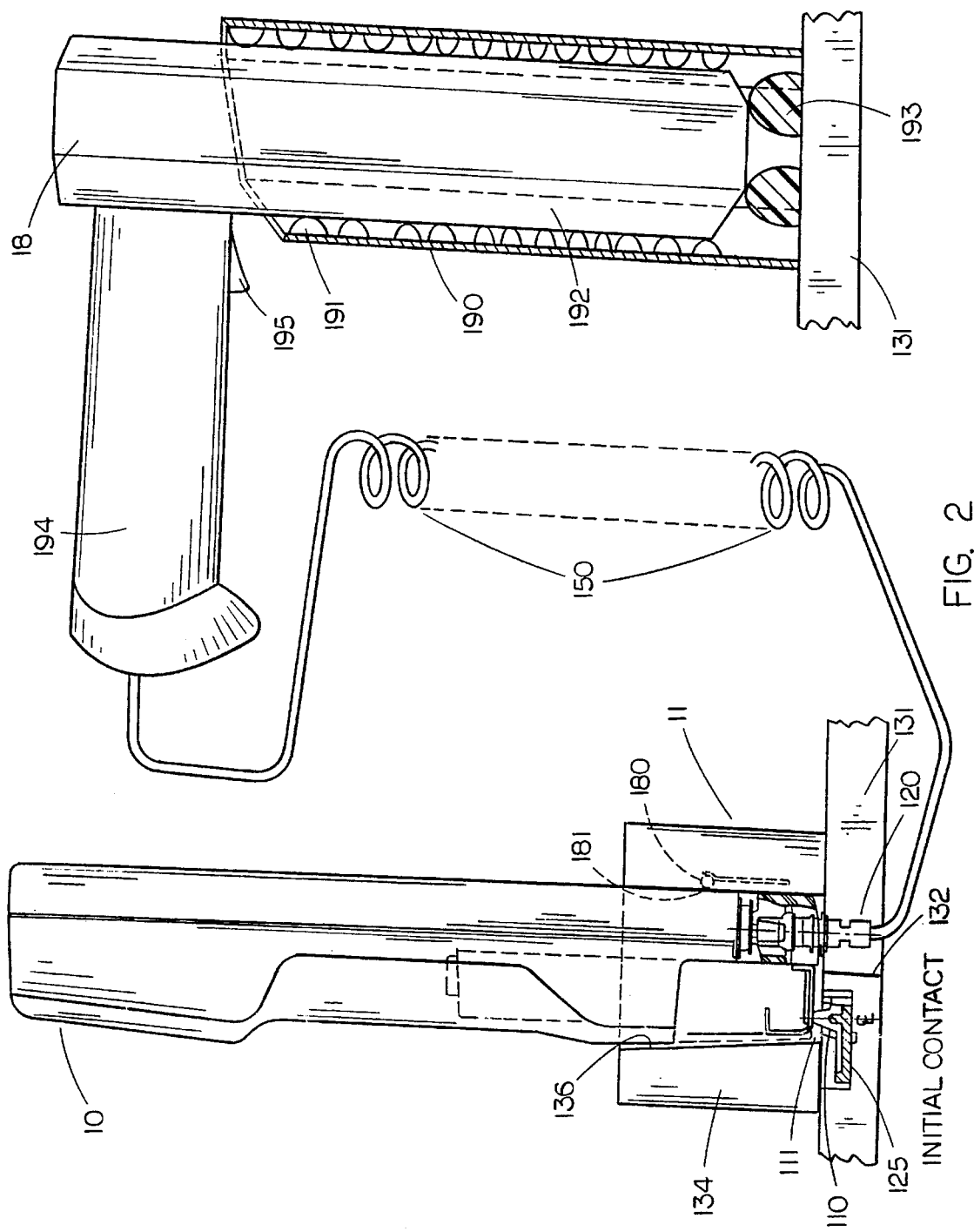
Figure 3:
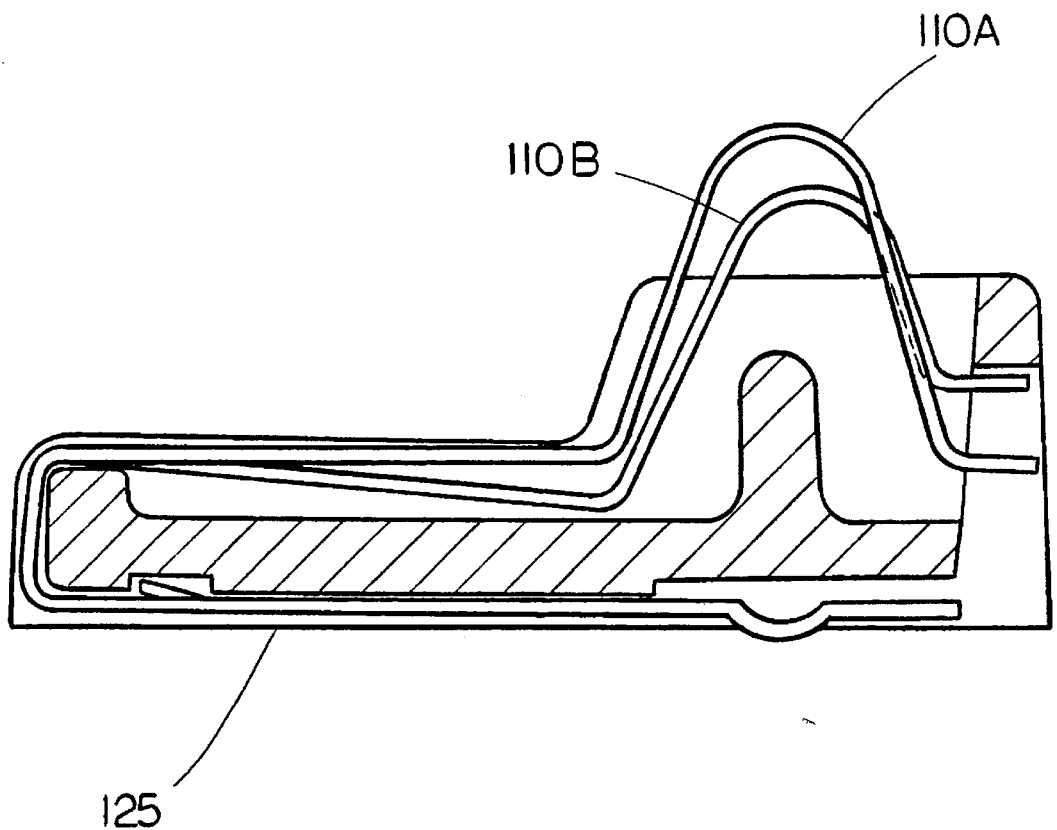
FIG. 3 is a somewhat diagrammatic longitudinal sectional view showing the contact assembly of the docking apparatus of FIG. 2 on a greatly enlarged scale.
Figure 4:
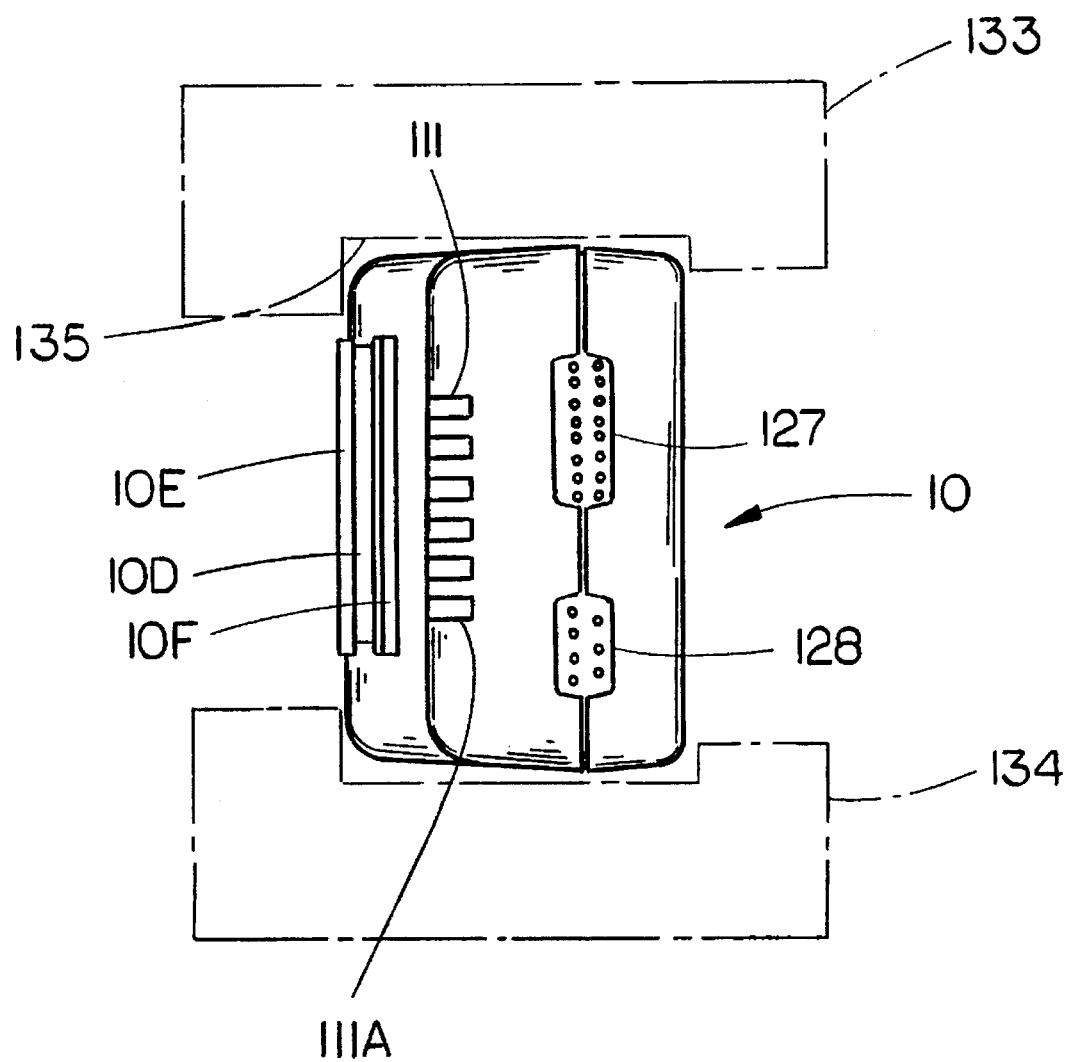
FIG. 4 is a diagrammatic bottom plan view of the terminal of FIGS. 1 and 2, illustrating the external contact pads of the terminal and also the connector fittings for coupling the terminal with a scanner such as the handheld laser bar code scanner which is diagrammatically indicated in FIGS. 1 and 2.

Description of FIGS. 2, 3 and 4

A significant difference between the LAN configurations typically used for personal computer networking and communications, and the configuration described here for use with portable data terminals has to do with the mechanical connector method employed for interface to the electrical network. Presently common commercially available LAN products may utilize coaxial cables and connectors, twisted pair conductors with some type of connector termination or in some cases, telephone wire with modular phone jacks. Each of these physical interface methods requires a "fastening" and "unfastening" operation when the attached device is connected and unconnected from the network. An important feature of the portable LAN described here is in its method of electrical connection between the LAN and the connected portable terminal which must be removed and replaced often during operation. To eliminate the need for fastening and unfastening of a connector, in a preferred embodiment conductive contact pads 111 are exposed e.g. at an undersurface of each terminal such as terminal 10, FIG. 1, and each docking unit such as 11 is provided with spring loaded mating contacts 110. The docking unit holds the terminal securely in place while aligning the external contact pads 111 with the mating contacts fingers 110. An additional feature of the LAN interface docking unit for mobile mounting applications is in its "open face" which allows connection to a scanner such as 18, FIGS. 1 and 2, without impeding the placement and removal of the terminal from the docking unit. Thus referring to FIG. 2, terminal 10 is shown in initial contact with the docking unit indicated at 11, with a connector 120 leading to scanner 18 located in the open area of the docking unit. The docking unit may have a contact assembly 125 including spring fingers 110 aligned with respective terminal contact pads 111. FIG. 3 is an enlarged view of contact assembly 125 and shows the initial position of contact finger 110 at 110A, and shows a deflected position at 110B (the terminal being fully inserted into and frictionally held by the adapter to maintain the deflected condition 110B of the spring fingers).

FIG. 4 is a bottom plan view of the terminal 10, showing its set of contact pads such as 111, and showing connector fittings at 127 and 128 one of which may receive the scanner connector 120, FIG. 2. In FIGS. 2 and 4, docking unit 11 is shown as comprising a base part 131 which may be notched at 132 to accommodate scanner fitting 120, and a pair of upstanding generally C shaped parts 133 and 134 which define a channel 135 for receiving the terminal 10. The parts 133 and 134 may have sloping surfaces such as 136, FIG. 2, which limit the downward movement of a terminal into the receiving channel, and serve to frictionally retain the terminal with a suitable degree of pressure between contact pads such as 111 and mating spring fingers such as 110.

The present disclosure represents a significant improvement, for example in providing one or more mobile mount docking units such as 11, FIG. 1, on a multidrop data bus with diverse peripheral devices such as 12 to 15, FIG. 1. Further, various devices may be added to the system on a dynamic basis during system operation, and assigned addresses as they become active on the network.

The conduit system containing the LAN data bus and power supply conductors may also contain a charging power line for supplying charging power to one of the contact fingers 110 which mates with the charging current input contact pad e.g. 111A, FIG. 4, of the terminal 10.

Discussion of Related Patent Application Concerning Battery Charging Control

A pending application of Steven E. Koenck "MICROPROCESSOR CONTROLLED FAST CHARGING SYSTEM" U.S. Ser. No. 07/266,537 filed Nov. 2, 1988, now abandoned, is a continuation in part of pending application Ser. No. 07/168,352 filed Mar. 15, 1988, now U.S. Pat. No. 4,885,523 issued Dec. 5, 1989 and the entire Disclosure of application Ser. No. 07/168,352 is incorporated herein by reference.

The twenty-seventh figure of the incorporated application shows a charging arrangement which may be applied to an individually manned transport vehicle with local area network system as taught herein. Thus, terminal 10 of the present disclosure may incorporate the terminal system (27-10A) and battery pack (27-10B) of the twenty-seventh figure. A charger (27-22) may be mounted adjacent mobile mount docking unit 11 and receive charging power from the vehicle. Where the vehicle system supplies power at a relatively high voltage such as seventy-two volts, preferably such voltage is reduced to a lower voltage value such as twelve volts at a location near the vehicle power source and then power at such lower voltage value is supplied by a suitable cable to the charger component (27-22). In this embodiment, the charger has terminals labeled +CHARGE, TEMP, GND, CHG CONTROL which would be connected to four of the spring fingers 110, FIG. 2, of the mobile mount docking unit 11. The other two spring fingers 110 would be connected to the lines LAN+DATA and LAN-DATA of the twenty-seventh figure which would correspond with LAN data bus 16, FIG. 1. The LAN interface (27-39) of the twenty-seventh figure would include a line driver/receiver, which would receive +5 volts and the Power control signal from the microcomputer of the terminal system (27-10A) of the twenty-seventh figure.

Discussion of FIGS. 1–5

FIG. 1 illustrates a vehicle data system for vehicles such as forklift trucks and delivery vans which are utilized in product transport processes and the like. Such vehicles normally contain vehicle electric power means associated with the vehicle drive, e.g., a motive power engine-driven alternator or generator and vehicle storage battery for use in starting the engine, or electric storage batteries which themselves provide the propulsion energy. The vehicle power represented at 19 in FIG. 1 preferably is derived from the vehicle electric power means. Vehicle power may also energize the LAN devices 12 to 15, FIG. 1, as well as the interface circuits for devices 12 to 15, which may correspond with a LAN interface. In such a case vehicle power is supplied via suitable voltage regulator means as well as a microcomputer, for each device permanently associated with the LAN data bus in FIG. 1. The local area network means of FIG. 1 is preferably powered at least in part from vehicle electric power means and independently of fixed power sources.

While FIG. 1 shows an optical or RF scanner means 18 connected by a cable 150 and cable fitting 120 with a connector of the terminal 10 to form data terminal and scanner means, parts 10 and 18 may be in a single unit as shown for example in an application of Phillip Miller, et al., U.S. Ser. No. 07/136,097 filed Dec. 21, 1987, now abandoned, and as indicated at 5-10, FIGS. 5A and 5B herein. The handle 5-15, FIGS. 5A and 5B of the unit 5-10, may contain a series of external contacts corresponding to contacts 111, FIG. 2 and 4, as indicated at 5-111, FIGS. 5A and 5B for engaging with spring fingers corresponding to fingers 110, FIGS. 2 and 3. In this case, the receiving channel of the mobile mount docking unit of FIG. 1 would frictionally receive the handgrip part 5-15 and support the horizontally extended undersurface 5-15A of the scanner barrel, while providing adequate clearance so as to insure against actuation of the trigger 5-32 as the scanner and terminal means 5-10 is inserted into and removed from the various docking units. Convenient access to the card receptacle 5-20 of the scanner and terminal means 5-10 would thus be provided while the scanner and terminal unit 5-10 would be held securely to enable normal application of manual pressure to the keyboard segments such as 5-11B. A window 5-14 mounted on the distal region of the housing in front to the keyboard 5-11B and the display 5-12 is also provided. The window 5-14 is positioned in the light output path and the reflected light path to permit the light output and the reflected light to pass through the window 5-14 and unobstructedly travel exteriorly of the window 5-14 without passing over the keyboard.

Alternatively, the mobile mount docking units may contain interface components which are energized from vehicle power, and also alternatively an optical coupling may be provided between a light emitting diode and light sensor of the scanner and terminal unit 5-10 and a microcomputer within each adapter for accommodating the interchange of data between the scanner and terminal unit 5-10 and the LAN data bus, e.g. to effect printout of data from the scanner and terminal unit on a printer such as 14, FIG. 1, or to effect transmission of data.

The present invention may be implemented on an individually manned transport vehicle where the driver of the vehicle is the one concerned with operation of the on board devices. Since the driver at times must devote full attention to guidance of the vehicle, it is particularly appropriate that the data capture devices can be quickly inserted into and removed from mobile mount docking units, so that the driver may be completely unencumbered while driving the vehicle. It is advantageous to have a large area display which can be read at a distance, e.g., from the driver seat of the vehicle. Such a display can provide information which is useful in moving from one work location to another, e.g. geographical type information; the display being positioned so that such information can be read at a glance e.g. during a brief stop of the vehicle while the driver remains at the controls of the vehicle.

Each of the connectors such as represented at 161 to 165, FIG. 1, may be a standardized quick-connect and quick-disconnect type so that docking units and devices may be interchanged and placed at desired locations about each type of individually manned transport vehicle. For example, each connection such as 161 may include a set of spring fingers such as 110 receiving the LAN+ and LAN− connections such as 101,102, FIG. 6. Each device may then include an interface and power supply means for energizing these components from vehicle electric power, (vehicle electric power being available e.g. from a twelve-volt d.c. plug-in power receptacle adjacent each connection 161–165.

Each connection such as 110, 111, FIG. 7, may be maintained by a frictional ball and socket type detent such as indicated at 180, FIG. 2, which seats with an audible click into a terminal recess 181 when correct deflection of spring contacts 110 has been achieved.

In the embodiment shown in FIG. 4, the RF terminal 10 has a connector 127 providing for signal communication according to the RS-232 format. In this way terminal 10 may be compatible with an earlier version of docking system utilizing pin and socket type connectors. Where the docking unit is to receive RF terminals according to FIG. 4 which are not equipped with a LAN interface such docking unit may be provided with a cooperating pin type connector 254 which is fully engaged with terminal connector 127, FIG. 4, when the terminal is inserted in channel 207 to the position established by detent means.

An advanced type of RF terminal may omit both connectors 127 and 128, FIG. 4, so that the terminal is entirely free of recesses of the type indicated at 127 and 128 in FIG. 4. In this case, coupling to a separate reader unit such as 118 may be by means of a wireless link. All electrical contact type connections will then take place through contact pads such as 111, 111A, FIG. 4, which are generally flush with the exterior of the terminal unit for maximum imperviousness of the terminal to contaminants and mechanical damage.

As indicted at 181 in FIG. 2, the data terminal 10 has indentations for establishing fully inserted position. Upon insertion of the terminal, its lower end cooperates with the segmental spherical external surfaces of the detents to deflect the detents rearwardly until the cooperating indentations of the terminal are moved into register therewith.

Discussion of Existing Commercially Available Components

The Route-commander® system by Norand Corporation of Cedar Rapids, Iowa consisting of a high-performance portable data terminal coupled to a ruggedized printer has virtually eliminated the use of manual route books and handwritten invoices in the beverage, snack, dairy and bakery delivery industries. This is one example where an individually manned transport vehicle may utilize a vehicle date system as disclosed herein.

With the introduction of low cost, efficient data communication radio systems such as the RT 1200 and 2200 systems by Norand Corporation, it has become attractive to utilize radio data communications to automate the information processes used in material handling, particularly on lift trucks. The RT 1210 and RT 2210 data terminals are battery powered hand-held two-way radio data transceivers with keyboard, LCD display, built-in radio communication hardware and support for high-performance optical bar code readers. Communication to the portable terminals is accomplished by interfacing and RM 2216 terminal multiplexor and RB 2212 base transceiver to a host computer through a communication port. The host computer may transmit to or receive data from any selected terminal at any time. Although the RT 1210 and RT 2210 terminals were originally designed for hand-held operation, they have been used in mobile applications by placing the entire terminal into a receptacle which holds the unit firmly in place and isolates the unit from vibration and shock. Power for operation is provided by the terminal battery pack.

It will be apparent that many modifications and variations may be effected without departing from the scope of the novel teachings and concepts of the present disclosure.

What is claimed is:

1. In a data capture system,
   (a) hand held data terminal means having a size and weight to be held in one hand, and having an exterior;
   (b) said hand held data terminal means having rechargeable battery means for supplying power thereto during portable operation;
   (c) terminal receptacle means for releasably receiving said hand held data terminal means for the recharging of said rechargeable battery means;
   (d) said hand held data terminal means having electrical contact pad means for coupling with said rechargeable battery means;
   (e) said terminal receptacle means having cooperating electrical contact means for engagement with the electrical contact pad means of said hand held data terminal means when inserted into said terminal receptacle means such that recharging of said rechargeable battery means can be effected via said electrical contact pad means and the cooperating electrical contact means in engagement therewith;
   (f) said hand held data terminal means having said electrical contact pad means generally flush with said exterior thereof, said cooperating electrical contact means of said terminal receptacle means being resiliently urged for pressure engagement with said electrical contact pad means without requiring any substantial penetration of the terminal receptacle means into the hand held data terminal means, and the receptacle means engaging the hand held data terminal means and holding the hand held data terminal means to maintain said pressure engagement between said electrical contact pad means and the cooperating electrical contact means;

(g) said hand held data terminal means having generally the shape of a pistol with a user interface at an upper side, an optical reader directed frontally and said electrical contact pad means being located remote from said upper side;

(h) said terminal receptacle means having an extended supporting surface for confronting the exterior of said hand held data terminal means at an underside of the hand held data terminal means which is directed oppositely in comparison to said upper side; and (i) said electrical contact pad means of said hand held data terminal means having a normal position relative to said exterior in the absence of engagement with said cooperating electrical contact means, and not being deflected from said normal position relative to said exterior as the hand held data terminal means is inserted into position in said terminal receptacle means in spite of the pressure engagement of said cooperating electrical contact means therewith.

2. In a data capture system, (a) a hand held data terminal having a size and weight to be held in one hand, and having an exterior;

(b) said hand held data terminal having rechargeable battery means for supplying power thereto during portable operation;

(c) a terminal receptacle for releasably receiving said hand held data terminal for the recharging of said rechargeable battery means;

(d) said hand held data terminal having electrical contact pad means for coupling with said rechargeable battery means;

(e) said terminal receptacle having cooperating electrical contact means for engagement with the electrical contact pad means of said hand held data terminal when inserted into said terminal receptacle such that recharging of said rechargeable battery means can be effected via said electrical contact pad means and the cooperating electrical contact means in engagement therewith;

(f) said hand held data terminal having said electrical contact pad means generally flush with said exterior thereof, said cooperating electrical contact means of said terminal receptacle being resiliently urged for pressure engagement with said electrical contact pad means without requiring any substantial penetration of the terminal receptacle into the hand held data terminal and the terminal receptacle engaging the hand held data terminal and holding the hand held data terminal to maintain said pressure engagement between said electrical contact pad means and the cooperating electrical contact means;

(g) said hand held data terminal having generally the shape of a pistol with manually actuatable keys at an upper side, an optical reader directed frontally and said electrical contact pad means being located remote from said upper side;

(h) said electrical contact pad means of said hand held data terminal having a normal position relative to said exterior in the absence of engagement with said cooperating electrical contact means, and not being deflected from said normal position relative to said exterior as the hand held data terminal is inserted into position in said terminal receptacle in spite of the pressure engagement of said cooperating electrical contact means therewith; and (i) said terminal receptacle supporting said data terminal with said manually actuatable keys accessible to the user, and holding said data terminal to enable normal application of manual pressure to said manually actuatable key.

3. In a data capture system, (a) a hand held data terminal having a size and weight to be held in one hand, and having an exterior;

(b) said hand held data terminal having rechargeable battery means for supplying power thereto during portable operation;

(c) a terminal receptacle for releasably receiving said hand held data terminal for the recharging of said rechargeable battery means;

(d) said hand held data terminal having electrical contact pad means for coupling with said rechargeable battery means;

(e) said terminal receptacle having cooperating electrical contact means for engagement with the electrical contact pad means of said hand held data terminal when inserted into said terminal receptacle such that recharging of said rechargeable battery means can be effected via said electrical contact pad means and the cooperating electrical contact means in engagement therewith;

(f) said hand held data terminal having said electrical contact pad means generally flush with said exterior thereof, said cooperating electrical contact means of said terminal receptacle being resiliently urged for pressure engagement with said electrical contact pad means without requiring any substantial penetration of the terminal receptacle into the hand held data terminal, the terminal receptacle engaging the hand held data terminal and holding the hand held data terminal to maintain said pressure engagement between said electrical contact pad means and the cooperating electrical contact means;

(g) said hand held data terminal having generally the shape of a pistol with a user interface at an upper side, an optical reader directed frontally and said electrical contact pad means being located remote from said upper side;

(h) said terminal receptacle confronting portions of the exterior of said hand held data terminal which are remote from said upper side and providing user access to said user interface; and (i) said electrical contact pad means of said hand held data terminal having a normal position relative to said exterior in the absence of engagement with said cooperating electrical contact means, and not being deflected from said normal position relative to said exterior as the hand held data terminal is inserted into position in said terminal receptacle in spite of the pressure engagement of said cooperating electrical contact means therewith.

* * * * *